United States Patent Office 3,041,178
Patented June 26, 1962

3,041,178
PROCESS FOR PREPARING AN EDIBLE CLAM PRODUCT
John Marvin, Boston, Edward E. Anderson, Lexington, and Judith H. Tichenor, Cambridge, Mass., assignors, by mesne assignments, to Saltesea Packing Company, Providence, R.I., a corporation of Rhode Island
No Drawing. Filed May 3, 1960, Ser. No. 26,435
8 Claims. (Cl. 99—111)

This invention relates to a new food product and more particularly to a new snack item made from sea clams.

The large surf clam or sea clam (*Mactra solidissima*) is now a well known source of food and it is normally prepared by deep-fat frying sections of the edible portion to give a product closely resembling small fried clams. The resultant foodstuff typically has a crisp surface but a moist and juicy interior. Frying is accomplished by the housewife or by the restaurant just prior to serving. Alternately the fried clams may be frozen in which case they must be heated through before eating. It would be desirable, however, to have a process which would permit preparing this type of clam to make it available in a ready-cooked form which would not need any further processing. In particular it would be desirable to have available a snack item made from clams which could be eaten cold in much the same way as potato chips and the like.

It is therefore an object of this invention to process certain edible portions of the sea clams in a new way to provide a novel snack item which may be consumed directly without any further treatment, e.g., heating. It is another object to provide a clam product having a unique flavor and texture. Yet another object is to provide a clam product which is crisp and tender and which has a very low moisture content. Another object is to provide a process by which portions of the sea clams may be cooked to form a snack item. These and other objects will become apparent in the following description of this invention.

The shucked sea clams constitute about 50% by weight of edible material, including the rims or straps, the eyes, the foots or tongues and snouts. In the process of this invention the clam foots are used. These are large triangular shaped muscular pieces amounting to about 50% of the edible part of the clam and they lend themselves readily to slicing.

The process of this invention, which includes the steps of cleaning, slicing, soaking and breading the resulting slices, is characterized by the steps of bringing the sliced clam meats to a temperature between about 140 and 160 F. and of deep-fat frying the breaded clam meat strips to reduce the moisture, preferably below 2% by weight. The resulting product is a crisp, tender snack item having a characteristic clam flavor which may be blended with any other desired flavor incorporated before or after the frying process. The product is further characterized as having an extremely low moisture content, preferably below 2%, thus making it particularly suitable as a snack item to be eaten cold.

The steps of the process may now be described in detail. The clam foots which are to be used are, of course, separated from the other edible portions of the clams and are washed or cleaned to any desired extent to remove sand and the like. The foots are then cut or sliced to a desired thickness preferably to give slices which range from one-sixteenth to one-half inch in thickness. It will be appreciated that it is difficult to slice the foots any thinner than one-sixteenth of an inch and if the slices are thicker than one-half inch the final product will be thicker than normally desired.

The resulting sliced clam meats are then soaked in a suitable liquid medium which typically may be water, clam juice, or a combination of these two liquids. The soaking time may be from about a few seconds (i.e., dipping) to several days. If soaking is to be accomplished over an extended period of time, it is preferably carried out under refrigerated conditions. This soaking aids in retaining the original size of the clam meats throughout subsequent processing operations and appears also to effect tenderization of the sliced clam meats. The soaked clam meats may be used immediately for further processing or they may be frozen and stored for subsequent processing. Freezing at this point of the process appears to contribute somewhat to the ultimate tenderization of the clam meats, although it is not necessary.

If the clam meats have been frozen after the first soaking they must, of course, be thawed by any suitable process before processing further. In any case the unfrozen, or frozen clam meats subsequent to thawing are drained to remove any liquid which will drain off of the clam meats at this point.

The resulting drained clam meats are then combined with approximately an equal weight of tap water (at about 45–75° F.) and the resulting mixture of clam meats and water is brought to a temperature of between 140 to 160° F. and then cooled. In this heating step the temperature of the clam meats reaches substantially the same temperature as that of the water. It is important in this heating step that the clam meat temperature does not exceed about 160° F. For if the clams are heated to an appreciably higher temperature than 160° F. or boiled, the resulting product is extremely tough and inedible when prepared in its final form. It is not understood why this temperature range is critical, but if the clams are not heated to about 140° F. or if they are overheated, the final clam product is less desirable.

The clam meats are then immediately drained from the processing water and are immersed in a tap water bath ranging in temperature from about 45 to 75° F. This serves both to cool the clam meats and to give them a fresh liquid surface which will facilitate the pickup or adsorption of breading or batter materials or similar types of coating which are to be applied prior to final frying.

In the next step of the process the water dipped clam meats are given a coating for final deep-fat frying. The coating may be a breading or batter composition and may vary appreciably according to the desired final flavor and texture. Breading or batter compositions are usually formed from bread or cracker crumbs, wheat, corn, rice or soy flours, using powdered, skimmed or whole milk, powdered eggs, salts, spices and seasoning or mixtures of these. The coated clam meats are then introduced into hot cooking oil and cooked for a time sufficient to reduce the moisture content in the clam meats to between about one-half to 5% by weight. The moisture content is preferably reduced to less than 2% by weight. Cooking oils in this step may be maintained from about 320 to 400° F., with about 375° F. being typical. The cooking time will, of course, depend on the temperature of the cooking oil and the amount of moisture contained in the clam meats at the time they are introduced into the cooking oil.

The resulting cooked clam meats are then removed from the cooking oil, drained and then may be further seasoned if desired by application of appropriate spices or seasonings. Anti-oxidants may be added to the cooking oil or to the postfrying seasoning mixtures. Anti-oxidants may also be added to the container in which the resulting fried clam product is packed.

Finally the clam product may be packaged in cans, glass jars or moisture-proof containers of plastic, foil or paper materials. The air in such containers may be replaced with an inert atmosphere or a partial vacuum, but this is not required.

The clam product of this invention is a crisp, tender material which has a distinctive clam flavor which may be blended with other desired flavors depending upon the type of spices or seasoning incorporated in the clam meats during processing. The process of this invention makes a final snack product which has a very low moisture content.

The process of this invention may be further described in the following example which is meant to be illustrative and not limiting.

Fresh sea clams were shucked and the foot portions separated. The foots were then appropriately and uniformly sliced into strips about one-eighth inch thick. One thousand grams of sliced clam strips were added to an equal weight (1000 grams) of water at about 60° F. and the temperature gradually raised to about 158° F. In this cooking process the clams lost 52 to 53% of their original weight. The cooked clams were then drained on a stainless steel screen and allowed to cool. The total weight of clam juice and water that drained off after the cooking process was approximately 1,500 grams.

One hundred grams of these cooked clams were then immersed in cold water and allowed to remain there for 30 seconds. The clams were drained on a stainless steel screeen for 30 seconds and then breaded conventionally. The breaded clams were then immersed in a deep-fat fryer in which the cooking fat was at a temperature of 375° F. The clams were allowed to fry for a total frying time of 2 minutes 30 seconds. The fried clams which had a moisture content of about 2% by weight were then removed from the fryer, drained and cooled.

The finished product was then packed in a gas-tight foil bag.

We claim:

1. A process for preparing an edible product from clams including the steps of slicing edible clam foots and soaking the resulting sliced clam meats preparatory to deep-fat frying, heating a mixture of said sliced clam meats and water from about 45 to 75° F. up to a temperature of about 140 to 160° F., coating said clam meats and deep-fat frying the sliced clam meats in oil maintained at a temperature from about 320 to 400° F. until the water content of said cooked clam meats is reduced to less than 5% by weight.

2. Process in accordance with claim 1 wherein said deep-fat frying is continued until the water content of said fried clam meats is reduced to from about one-half to 2% by weight.

3. Process for preparing an edible product from sea clams comprising the steps of slicing the foots of deep sea clams, soaking the resulting clam meats in an aqueous clam juice thereby to substantially retain the original size of said clam meats throughout subsequent processing steps, forming a mixture of said clam meats with water at about 45 to 75° F., heating said mixture to between about 140 and 160° F., cooling the heated clam meats, coating the clam meats with a breading composition, and deep-fat frying the resulting coated clam meats until the moisture content is reduced to less than 5% by weight.

4. Process in accordance with claim 3 wherein said deep-fat frying is continued until the water content is reduced to less than 2% by weight.

5. Process in accordance with claim 3 further characterized by the step of dipping said clam meats in water subsequent to said heating step.

6. Process in accordance with claim 3 further characterized by the step of adding seasoning to said clam meats.

7. Process in accordance with claim 3 further characterized by the step of freezing said clam meats subsequent to said soaking step.

8. Process for preparing an edible product from sea clams comprising the steps of slicing the foots of deep sea clams, soaking the resulting clam meats in an aqueous clam juice thereby to substantially retain the original size of said clam meats throughout subsequent processing steps, forming a mixture of said clam meats with water at about 45 to 75° F. heating said mixture to between about 140 and 160° F., coating the clam meats with a breading composition deep-fat frying the resulting coated clams meats until the moisture content is reduced to less than 5% by weight, and packaging the resulting cooked clam meats in containers.

References Cited in the file of this patent

UNITED STATES PATENTS

| | | |
|---|---|---|
| 2,724,651 | Hampton et al. | Nov. 22, 1955 |
| 2,726,157 | Soffron et al. | Dec. 6, 1955 |
| 2,824,005 | Strasburger | Feb. 18, 1958 |